Dec. 1, 1970                L. O. HEFLINGER                3,545,000
SIMPLE DIRECTION OF ARRIVAL INDICATOR FOR PULSED PLANE WAVES
Filed June 2, 1969                                    2 Sheets-Sheet 1

Lee O. Heflinger
INVENTOR.

BY

ATTORNEY

Dec. 1, 1970   L. O. HEFLINGER   3,545,000
SIMPLE DIRECTION OF ARRIVAL INDICATOR FOR PULSED PLANE WAVES
Filed June 2, 1969   2 Sheets-Sheet 2

Lee O. Heflinger
INVENTOR.

BY [signature]

ATTORNEY

United States Patent Office 3,545,000
Patented Dec. 1, 1970

3,545,000
SIMPLE DIRECTION OF ARRIVAL INDICATOR FOR PULSED PLANE WAVES
Lee O. Heflinger, Torrance, Calif., assignor to TRW Inc., Redondo Beach, Calif., a corporation of Ohio
Filed June 2, 1969, Ser. No. 829,690
Int. Cl. G01s 3/48
U.S. Cl. 343—113   19 Claims

ABSTRACT OF THE DISCLOSURE

An instrument for indicating the direction of arrival of a wave of short duration. The wave may be an electromagnetic wave, but preferably is a mechanical wave such as a seismic or acoustic wave. A plurality of detectors is provided, each developing an electric signal upon arrival of the wave. These signals then feed a number of coils in such a manner that a current flows in each of the coils. This current has an intensity proportional to the difference in the time of arrival of the wave pulse at a predetermined pair of detectors. Further the intensity of the current corresponds to the patterns of the detectors and coils. This current flow will now set up a magnetic field which may be indicated by a magnet or the like. For example, there may be three detectors positioned at the vertices of an equilateral triangle and three coils positioned along the sides of another equilateral triangle parallel to the first. In this case a current may be made to flow through the three coils, which is simply proportional to the difference of the time of arrival of the wave pulse at any two of the three detectors.

BACKGROUND OF THE INVENTION

This invention relates generally to electronic instruments and particularly relates to an indicator for indicating direction of arrival of a wave pulse.

There are many applications for a simple instrument indicating the direction of arrival of a wave pulse. This may, for example, be an acoustic signal originating in the atmosphere or under water. For example, such an instrument may be used by a diver making an excursion under water from an underwater lab. If the water should be murky or if the diver should be at an appreciable depth he may be unable to see the place where he came from. However with the instrument of the invention he could quickly locate the direction of the underwater lab by an acoustic signal emitted by the lab. Alternatively the instrument may be used to locate the direction of origin of a seismic wave, or even the direction of arrival of a light pulse. In the latter case, it is necessary to utilize electronics capable of operating in the nanosecond range.

It is accordingly an object of the present invention to provide a relatively simple, lightweight and inexpensive instrument for indicating the direction of arrival of a wave pulse which may be either mechanical or electromagnetic.

A further object of the present invention is to provide an instrument of the character discussed which includes a set of detectors at arbitrary locations for feeding a set of indicating coils arranged in a regular pattern.

Another object of the present invention is to provide a simple direction of arrival indicator for pulsed waves wherein the detectors are disposed on the vertices of a regular polygon or polyhedron for simplifying the electronics and an indicating system which requires a minimum of indicating coils.

SUMMARY OF THE INVENTION

An instrument in accordance with the present invention serves the purpose of indicating the direction of arrival of a wave pulse. This wave may be an electromagnetic wave but preferably is a mechanical wave. To this end there is provided a predetermined number of detectors. Each detector develops an electric signal in response to the arrival of the wave pulse. These detectors are arranged in a predetermined pattern which may either be a regular or an arbitrary pattern. A predetermined number of coils is also provided. These coils are also arranged in a predetermined pattern which has a known relation to the pattern of the detectors. Means are provided which are coupled between the detectors and the coils for causing a current flow in each of the coils. This current has an intensity proportional to the difference in the time of arrival of the wave pulse at a predetermined pair of detectors. Furthermore, the current intensity corresponds to the patterns of the detectors and the coils.

As will be subsequently shown, if the detectors are arranged along the vertices of the regular polygon or polyhedron, the current intensities need be only proportional to the difference in the time of arrival of the wave pulse. Finally an indicator is provided for indicating the direcon of the magnetic field which is created by the current flow through the coils.

The noval features that are considered characteristic of this invention are set forth with particularity in the appended claims. The invention itself, however, both as to its organization and method of operation, as well as additional objects and advantages thereof, will be best understood from the following description when in connection with the accompanying drawing.

DESCRIPTION OF THE PREFERRED EMBODIMENTS

Figure 1:
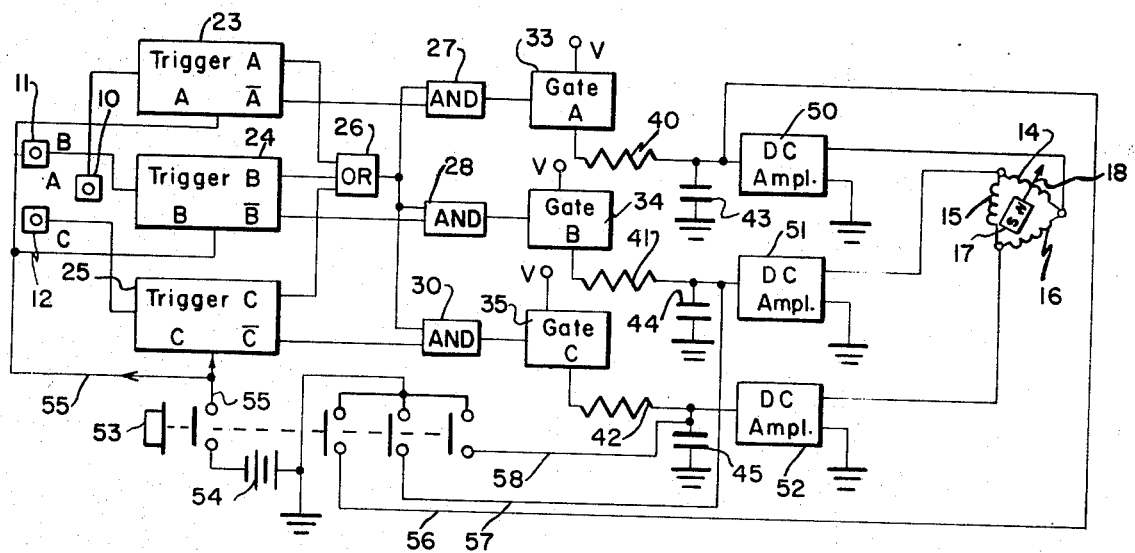
FIG. 1 is a block diagram of a direction of arrival indicator in accordance with the present invention in its simplest form featuring three detectors arranged on the vertices of an equilateral triangle and three indicator coils.

Referring now to the drawings and particularly to FIG. 1 there is illustrated a block diagram of an instrument in accordance with the present invention. In order to facilitate description of the invention one of the simplest arrangements possible in accordance with the present invention illustrated in FIG. 1 is first presented. Thus there are provided three detectors indicated at 10, 11 and 12 and identified by A, B and C respectively. The three detectors 10 through 12 are disposed in a plane on the vertices of an equilateral triangle, that is, on a regular polygon. Similarly, there are provided three indicating coils shown respectively at 14, 15 and 16. The three coils have axes disposed parallel to the sides of an equilateral triangle disposed in the same plane as is the equilateral triangle formed by the three detectors 10 through 12 and parallel thereto. There is also provided a permanent magnet 17 with north and south poles as shown, for indicating the direction of the magnetic field created when currents flow through the three coils 14, 15 and 16. A suitable pointer 18 may be attached to the permanent magnet 17.

Each of the three detectors 10, 11 and 12 is designed to deliver an electric signal in response to the arrival of a wave pulse. The wave may either be an electromagnetic wave or a mechanical wave such as an acoustic or seismic wave. If the wave is an electromagnetic wave the distance between the three detectors 10, 11 and 12 should be sufficiently large so that the differences in the times of arrival of the wave at the three detectors is at least on the order of nanoseconds. In that case, of course, the electronic circuit also must respond within that order of magnitude, that is, within nanoseconds. Preferably, however, the wave to be detected is a mechanical, that is, for example, an acoustic or seismic wave. In case of an acoustic wave the three detectors 10 through 12 could consist of a conventional microphone or underwater sound detector if the acoustic wave travels in a liquid, such as the ocean. Alternatively if a seismic wave is to be measured, the three detectors could consist of geophones. In any case, each of the detectors 10, 11 and 12 develops an electric signal in response to the arrival of the wave.

Figure 2:
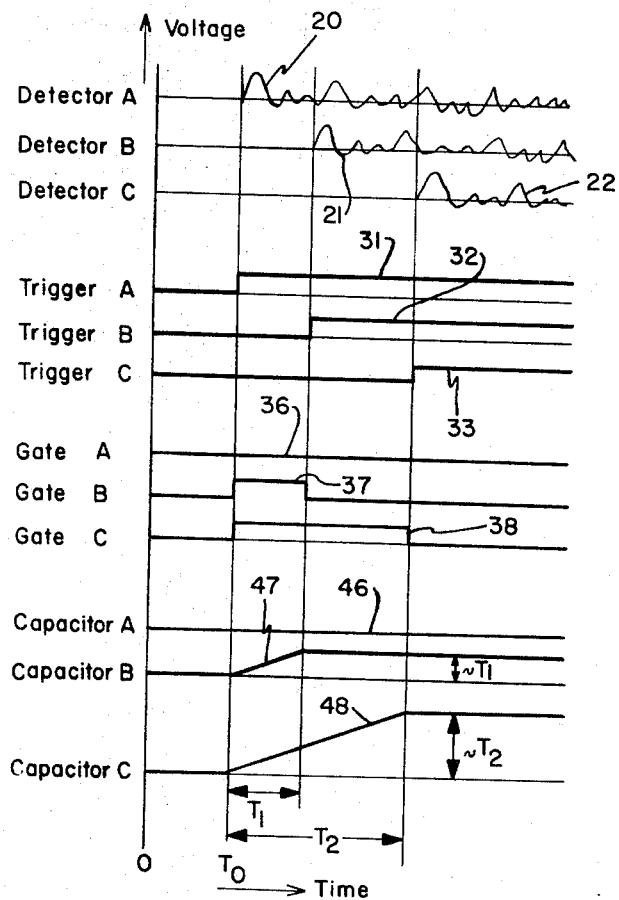
FIG. 2 is a graph showing the voltages at various points of the circuit of FIG. 1 as a function of time.

This has been shown in FIG. 2 where the voltage is plotted as a function of time. Thus, the three detectors A, B and C will develop respective electric signals 20, 21 and 22. Each of these signals corresponds to the same wave shifted in time from the others by a time difference $T_1$ and $T_2$ as shown in FIG. 2. These times correspond to the differences in the times of arrival of a wave between detectors A and B and A and C.

In accordance with the present invention these differences in the time of arrival, that is $T_1$ and $T_2$, are now converted into corresponding voltages, for example, by means of charge storage capacitors. These voltages in turn, are sampled by operational amplifiers such as DC amplifiers arranged, for example, as emitter followers for developing an output current proportional to the sampled voltages. Accordingly, the magnitude of the currents flowing through the three indicator coils 14, 15 and 16 varies in accordance with the differences of the times of arrival, that is, $T_1$ and $T_2$. This, of course, will develop a magnetic field due to the current flow which orients the permanent magnet 17 and gives an indication by the pointer 18 to point in the direction of arrival of the wave being measured.

It should be realized that the simple system of three coils 14, 15, 16, connected in a closed loop with the permanent magnet 17 is simply an example of a suitable indicator. Instead, any commercial indicating instrument may be used, such, for example, as a DC magnesyn available in the trade or a remote compass indicator could be used instead. Other readout instruments are equally suitable, such, for example as a standard synchro or selsyn. In this case, the output current may be chopped or interrupted so that an alternating current rather than a direct current is developed.

How the difference in the times of arrival of the wave is converted into a voltage which can then be sampled to develop a proportional output current will now be described in connection with FIG. 1. To this end the outputs of detectors 10, 11 and 12 are connected respectively to three trigger circuits 23, 24, 25, identified respectively as trigger A, trigger B, and trigger C. Each trigger circuit such as 23, 24, 25 may consist, for example, of a bistable multivibrator which changes state upon application of a signal thereto, or any other suitable circuit capable of changing states. As indicated, trigger A develops an output signal A and $\bar{A}$ where $\bar{A}$ indicates the complement of A, or in other words, not A. Accordingly the signals A, $\bar{A}$, B, $\bar{B}$ and C, $\bar{C}$ are available from the three triggers 23 through 25. These are now fed into an OR circuit or gate circuit 26. The OR circuit has its input connected to the signals A, B and C, to form the following expression $(A+B+C)$.

The logic further includes three AND circuits or gates 27, 28 and 30. Each of the three AND circuits is connected to the output of the OR circuit 26. In addition, AND circuit 27 is connected to receive the signal $\bar{A}$ while AND circuits 28 and 30 are similarly connected to the outputs of signals $\bar{B}$ and $\bar{C}$. Thus the output of AND circuit 27 is as follows $(A+B+C) \cdot \bar{A}$.

For the following illustrative example, it is assumed that the wave arrives in sequence at the detectors A, B and C in the order named. However, it will become apparent that the instrument of the invention, as illustrated in FIG. 1, will also operate if the wave to be detected arrives in any other direction. This is evident from the symmetry of the arrangement.

The outputs of triggers A, B and C are shown in FIG. 2 by curves 31, 32 and 33. It will be seen that the three signals 31, 32 and 33 start respectively at a time $T_0$ and the other two with time delays of $T_1$ and $T_2$, that is, when the signals 21 and 22 arrive at detectors B and C.

Three gates 33, 34 and 35 are respectively connected to the outputs of AND gates 27, 28 and 30. These gates have been identified by gate A, B and C. The signals applied to the three gates 33 to 35 are shown in FIG. 2 by curves 36, 37 and 38. It will be noted that curve 36 remains low to indicate a 0 throughout the time interval of interest. This will be evident from the above equation $(A+B+C) \cdot \bar{A}$. This simply means that AND gate 27 will only develop an output or a 1 when either signals A, B or C is present and when signal $\bar{A}$ is present. Since there is no signal $\bar{A}$ during the time interval there is no output or 1 from the AND gate 27. On the other hand, the output of AND gate 28 is defined by the following equation $(A+B+C) \cdot \bar{B}$. Here it will be noted that the signal $\bar{B}$ is present during the time interval $T_1$. Accordingly there is a 1 during the time period $T_1$ as shown by curve 37. Similarly the output of AND gate 30 is shown by the curve 38. This now means that the signal $\bar{C}$ is present during the time interval $T_2$.

The three gates 33 through 35 are turned on by the signal 36, 37 and 38. This simply means that the voltage source designated by V for each of the three gates A, B and C is now connected through a resistor 40, 41, 42 to three corresponding charge storage capacitors 43, 44, 45 for applying thereto a certain electric charge, each network 40, 43 or 41, 44 forming an integrating network. This is shown by the curves 46, 47, 48 of FIG. 2.

From the above, it will be evident as shown by curve 46 that capacitor A or 43 is not being charged. On the other hand, B or capacitor 44 is charged during the time period $T_1$ as shown by the curve 47. Similarly, as the curve 48 shows, the C capacitor 45 is charged during the time period $T_2$. Accordingly the voltages across the capacitors 43 through 45 are shown by the curves 46, 47, 48.

These voltages are now sampled by three DC amplifiers 50 through 52, each of which is connected respectively across the capacitor 43, 44, 45. The three amplifiers 50 through 52 may simply be considered as operational amplifiers, that is, amplifiers having a substantially infinite input impedance and a substantially zero output impedance. Accordingly, each amplifier delivers an output current proportional to the voltage existing on its input capacitor. The three DC amplifier followers may, for example, consist of a field-effect transistor followed by a conventional transistor connected in an emitter-follower configuration.

The three currents which now flow through the indicator coils 14, 15 and 16 corresponding to the output currents delivered by DC amplifiers 50, 51 and 52 create a magnetic field to which the permanent magnet 17 responds so that the pointer 18 points in the direction of the magnetic field. It will be subsequently shown that the direction of this magnetic field is the direction of arrival of the wave pulse to be measured.

The circuit of FIG. 1 may be reset by a reset button 53. This includes a battery 54 having its positive terminal grounded while its negative may be connected when the button 53 is actuated to a lead 55. This will now apply a negative voltage to the three trigger circuits 23 through 25 through the lead 55. At the same time, ground is applied to leads 56, 57 and 58. Lead 56 is connected to the capacitor 43, thus discharging it. Similarly leads 57 and 58 serve the purpose of discharging capacitors 44 and 45. Accordingly, once the reset button 53 is actuated the entire circuit is reset so that the trigger circuits are restored to their initial zero state and the capacitors to their zero voltage so that the system is ready for indicating the direction of arrival of the next wave.

It has been found that the embodiment of the invention of FIG. 1 does indeed show the direction of arrival of a wave pulse. It can also be proven mathematically that the pointer 18 does indicate the true direction of arrival of such a wave pulse. Thus from trigonometrical considerations of the equilateral triangle formed by the detectors 10, 11 and 12, the following formula for the torque on the magnet 17 can be derived:

$$-C\frac{l}{v}\sin(\Phi - \theta) \qquad (1)$$

wherein C is a constant, $l$ is the length of the side of the equilateral triangle, $v$ is the velocity of the wave, $\Phi$ indicates the position of the pointer measured counterclockwise from the direction of the altitude through detector A, and $\theta$ is the angle between the direction of arrival of the wave and an extention of the altiude of the triangle previously described. This Formula 1 shows that the torque is such that the pointer 18 is always driven to the equilibrium position of $\Phi = \theta$. This, of course, means that the pointer 18 points in the direction of arrival of the wave.

It should be noted that the embodiment of the invention of FIG. 1 uses only three detectors and three indicator coils, both disposed in the same plane. Nevertheless, if a wave arrives from a direction out of the plane in which the detectors and indicating coils are located, the azimuth indicated by the instrument is still correct for the direction of arrival of the wave. In that case, as measured in the horizontal plane, the effective wave velocity $v$ is increased. However, the particular value of $v$ is unimportant.

It can also be proven that the instrument of FIG. 1 will give a correct indication where the detectors and the indicating coils are disposed at the vertices of any regular polygon. In this case, both detectors and indicating coils should be disposed in the same plane.

However, the instrument of the present invention will also operate in three dimensions. In this case, the detectors and the indicating coils may be disposed at the vertices of a regular polyhedron. There are only five regular polyhedrons, namely, the tetrahedron, cube, octahedron, dodecahedron, and icosahedron, having respectively 4, 8, 6, 20 and 12 vertices. Obviously, the tetrahedron offers a simple instrument requiring only four channels and four coils. It is also feasible to superimpose several sets of polyhedrons of the type discussed above.

The proof that an instrument where the detectors are at the vertices of a regular polyhedron will correctly indicate the direction of arrival of a wave pulse may be made in a similar manner. The following equation shows that the magnetic field generated by the coils has the same direction as the wave direction denoted by the vector W which is a unit vector opposite to the direction of wave propagation:

$$\sum_{j=1}^{n}(A_j \cdot W)(A_j X W) = 0 \qquad (2)$$

In the above equation $A_j$ is a unit vector pointing from the origin to one of the vertices of the polyhedron W as indicated above is a unit vector opposite to the direction of wave propagation, and finally $n$ is the number of coils all having a common grounded center.

It will be readily apparent from the circuit of FIG. 1, that instead of three channels, four, six or eight channels can readily be provided by using the same type of logic as in FIG. 1. It should also be noted that the octahedron requires only six channels and three center-tapped orthogonal readout coils. From this arrangement it is particularly simple to obtain separate altitude and azimuth readouts. Thus the azimuth readout is obtained from four detectors in the horizontal plane together with two orthogonal coils. The altitude readout is obtained by forming the orthogonal vector addition of the two horizontal components. How this is effected will subsequently be explained in connection with FIG. 6. For the extensions of the invention just discussed, where more than three channels are used, it can again be proven that the detector operates regardless of the direction in which the wave to be detected arrives.

Figure 3:
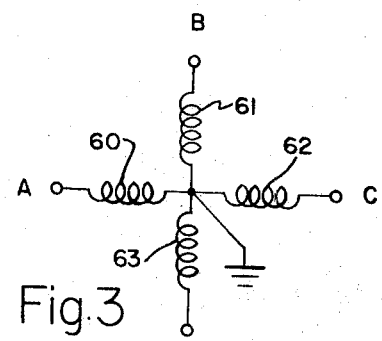
FIG. 3 illustrates schematically an arrangement of four indicator coils which may be utilized with a set of four detectors arranged on the vertices of a square.

It can now be shown that the systems previously discussed can be simplified while still indicating the direction of arrival of a pulsed wave. For these simplifications, it is also true that the detector operates correctly, regardless of the direction of arrival of the pulsed wave. This is due to the fact that some of the configurations previously discussed have a certain amount of degeneracy. Assuming, for example, that the detectors and coils are each arranged in a square, which is of course, one of the regular polygons. Thus there would be four channels and four coils, the latter being shown in FIG. 3 at 60, 61, 62 and 63. The four coils are arranged to form a cross, each having one end connected to ground as shown.

Figure 4:
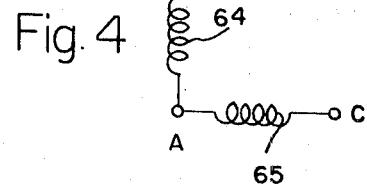
FIG. 4 illustrates a schematic arrangement of two coils which may be utilized in lieu of the four coils of FIG. 3.

It can now be shown that the same performance is obtained even if the common connection between the four coils and ground are removed. In this case, there are still four separate coils 60 through 63, any two of each such as 60 and 62 or 61 and 63 being connected to each other. Essentially, such an arrangement measures the north-south and east-west propagation time delays between respectively detectors B and D and detectors A and C. Accordingly, it will readily be seen that the detectors or coils can be displaced as shown in FIG. 4. Here there are only two coils or detectors 64 and 65. The two coils 64 and 65 are arranged at right angles to each other with a common connection at A.

Such an arrangement permits a certain simplification of the electronics in the two-dimensional case where the detectors are disposed in one plane. This has been shown in FIG. 5, to which reference is now made. Accordingly there are again provided three detectors 10, 11 and 12, arranged in the manner shown in FIG. 4. Each detector 10, 11 and 12 may be followed by an amplifier 70, 71 and 72 respectively. The amplifier 70 is followed by a trigger circuit 23 and the other two amplifiers 71 and 72 are followed respectively by trigger circuit 24 and 25. Each of the trigger circuits 23 through 25 will generate both signals, such as A and its complement $\overline{A}$.

Figure 5:
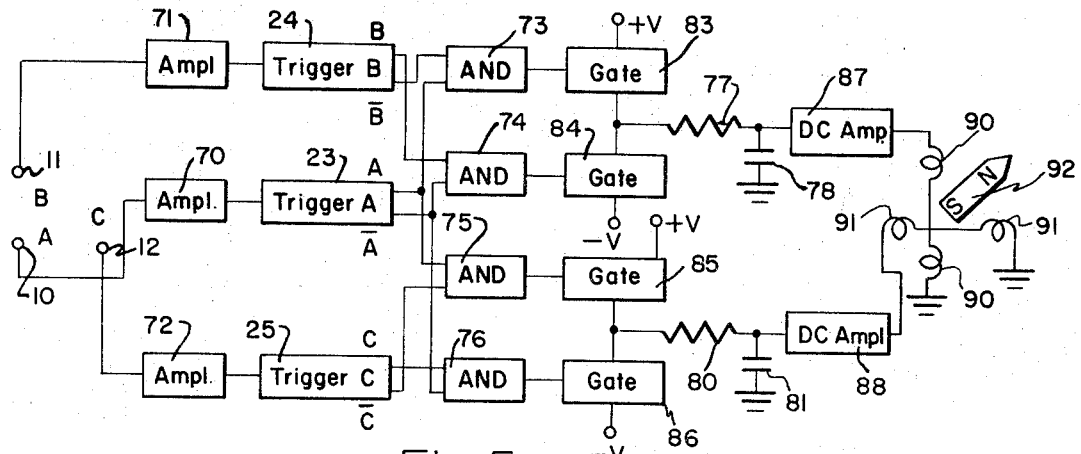
FIG. 5 is a block diagram of an instrument in accordance with the present invention similar to that of FIG. 1 and suitable where three separate detectors and two indicator coils are employed for indicating the direction of arrival of a wave in a plane.

In the circuit of FIG. 5 no OR circuits are needed. On the other hand, there are now four AND circuits 73 through 76. AND circuit 73 is so connected to the trigger circuits that it receives the signals $\overline{B}$ and A. Similarly AND circuit 74 receives signal B and $\overline{A}$, AND circuit 75 receives signal A and $\overline{C}$, while AND circuit 76 receives the signal C and $\overline{A}$.

Each of the four AND circuits is followed by a gate such as gates 83, 84, 85 and 86. It should be noted that each of a pair of gates, such as gate 83, is connected to a positive voltage identified by +V, while its companion gate 84 is connected to a negative voltage −V. The joint output of each pair of gates, such as 83 and 84 is connected through a resistor 77 to a charge storage capacitor 78. The other pair of gates 85 and 86 also has a common output connected through a resistor 80 to a storage capacitor 81.

Each of the two storage capacitors 78 and 81 is followed respectively by a DC amplifier 87 and 88, each of which feeds one of a pair of coils 90 and 91. The two coils are arranged in a cross, that is, at right angles to each other. The magnetic field created by the current flow through the two pair of coils 90 and 91, will then orient the permanent magnet 92 to indicate the direction of arrival of the wave. It should be noted that the gate 83 is fed with a signal corresponding to the following Boolian equation $\overline{B} \cdot A$, while the gate 84 is fed with a signal corresponding to the Boolian equation $B \cdot \overline{A}$. Accordingly since the two signals are complementary, the capacitor 78 will always either be charged positively or negatively by one of the two gates. The same, of course, applies to the capacitor 81 which is also always either charged positively or negatively.

The simplification of the circuit of FIG. 5 over that of FIG. 1 is not great. Thus while the OR circuit of FIG. 1 has been omitted, one more AND circuit and one more gate are required. On the other hand, instead of the three DC amplifiers of FIG. 1, only two are required in the embodiment of FIG. 5.

However, it is also feasible to take advantage of the degeneracy in the three-dimensional case. It can be shown that both the octahedron and the cube may be degenerated into a system of four detectors arranged in the manner shown in FIG. 6. Thus one of the four detectors 100 may be imagined to be in the origin of a rectangular coordinate system, while the other three detectors 101, 102 and 103 are disposed at equal distances from the origin along the positive rectangular coordinate axis. The four detectors are identified by A, B, C and D.

Figure 6:
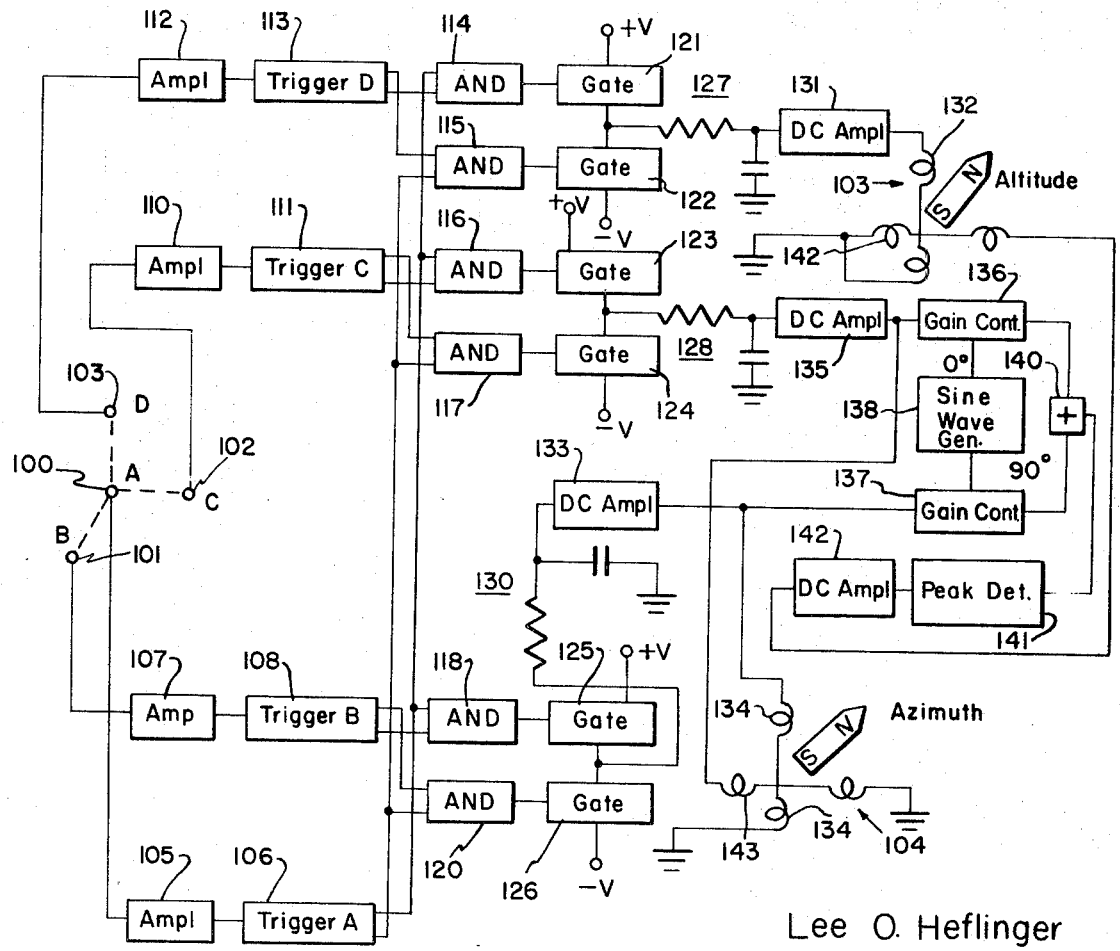
FIG. 6 is a block diagram of a more complex instrument in accordance with the present invention utilizing four detectors for detecting the direction of arrival both in azimuth and altitude by means of two separate pairs of indicator coils.

The logic must be somewhat modified to maintain operation over all directions. In the embodiment of FIG. 6 separate altitude and azimuth readouts 103 and 104 are shown. Each of the two readouts requires two pairs of coils. It is also feasible to use a direct three-dimensional readout. In this case, three orthogonal coils may be connected to the three DC amplifiers, as will presently be explained.

Each of the four detectors 100 through 103 is followed by an amplifier and a trigger circuit. Thus the detector 100 is followed by amplifier 105 and trigger circuit 106. Similarly, detector 101 is followed by an amplifier 107 and trigger circuit 108. The other two detectors are followed respectively by amplifiers 110 and trigger circuit 111 and by an amplifier 112 and a trigger circuit 113. There are also provided six AND circuits 114 through 120, each of which feeds a gate 121 through 126 respectively. The gates are connected in pairs as in the embodiment of FIG. 5. Thus there are three pairs of gates, such as gates 121 and 122 connected respectively to a positive and a negative voltage supply as shown. Their outputs are connected together to three respective integrating circuits 127, 128 and 130. Each of the integrating circuits again consists of a series resistor connected to a grounded capacitor.

The arrangement is such that of each pair of gates, such as gates 121 and 122, one will conduct to either charge positively or negatively its associated storage capacitor. This can be readily seen by analyzing the signals obtained from the respective input AND circuits. Thus, the AND circuit 114 receives two signals and forms the Boolian equation $\overline{D} \cdot A$, while the other AND circuit 115 forms the Boolian equation $D \cdot \overline{A}$. Since the two signals of the two AND circuits are complementary, it will be evident that either gate 121 or 122 will be rendered conductive during the time interval between receipt by detectors A and D or D and A. The same, of course, applies to the other pairs of gates 123, 124 and 126, 127.

The integrating circuit 127 is followed again by a DC amplifier 131, which furnuishes current to an indicating coil 132, connected between the output of DC amplifier 131 and ground. Similarly the integrating circuit 130 is followed by a DC amplifier 133, the output of which is connected to the coil 134 of the azimuth indicator. Also the integrating circuit 128 is followed by a DC amplifier 135, the output of which is connected to the other coil 143 of the azimuth indicator.

The other coil of the indicator requires a voltage proportional to $$\sqrt{x^2+y^2}$$

This voltage is essentially the vector sum of the $x$ and $y$ time delays. Such a voltage may, for example, be formed by having the output of the appropriate DC amplifiers, namely amplifiers 135 and 133 control the gain of a sinusoidal signal.

Each of the two amplifiers is connected to a gain control circuit 136 and 137 respectively. These, in turn, control the amplitudes of the signal from a sine wave oscillator 138 delivering a sine wave 90° out of phase to the two gain control circuits. The outputs of the gain control circuits are added by an adder 140 shown schematically which then feeds a peak detector 141 followed by a DC amplifier 142 which feeds the other coils 142 of the altitude indicator. Finally, the other coils 143 of the azimuth indicator are fed directly from the DC amplifier 135.

It should be noted that the system, including the sine wave oscillator 138, the gain control circuits 136, 137 and the adder 140 and the peak detector 141 is not needed if the output indicator is arranged in three dimensions, rather than with a separate altitude and azimuth indicator.

It should also be noted that the length of the arms of the detector, such as 101, 102 and 103 need not be equal. If they should be unequal, all that is necessary to adjust gains of the three DC amplifiers 131, 135 and 133 accordingly. Alternatively, the charging rates of the capacitors of the three integrating circuits 127, 128 and 130 may be compensated or varied or else the magnitude of the capacitors may be appropriately changed.

As indicated before, it is also feasible to obtain a three-dimensional readout. In this case, three orthogonal coils arranged along the three axes of a rectangular coordinate system may be used. The three coils may be then fed directly from the three DC amplifiers 131, 135 and 133.

Where extreme accuracy is needed, it may be preferable to use more detectors. For example, instead of the triangle, it may be preferred to use a square where higher higher accuracy is needed for an indication in a plane. On the other hand, the simplest regular polyhedron, namely, the tetrahedron, may be replaced by an octahedron or a cube to improve the accuracy. This, of course, requires a more complicated logic and more circuit elements.

So far, it has been assumed that the detectors are arranged in a regular or predetermined pattern and have regular or equal distances from each other. Thus the detectors could be arranged on the vertices of a regular polygon or polyhedron. This has been subsequently simplified so that the detectors are arranged along the axis of a rectangular coordinate system. However, it has been found that the arrangement of the detectors can be further generalized. From this generalization, there must be excluded singular cases. Among these are cases, for example, where all the detectors are disposed in a straight line. Thus may be two $n$ detector disposed in a completely arbitrary configuration concerning the axes between each pair of detectors and the relative distances between different pairs of detectors. The same applies to the direction of the axes of the indicator coils. In other words, the direction of the axes of the coils could be just as arbitrary as the pattern of the pairs of detectors.

It can now be shown that where both the patterns of the detectors and the coils are arbitrary, it is still possible to indicate the direction of arrival of a pulsed wave. Even this generalized case is correct for all directions of arrival of the wave, as can readily be shown. All that needs to be done is to control the gain of each channel corresponding to a pair of detectors to make up for the fact that the pattern of the detector coils is arbitrary. This can be shown as follows:

$$\sum_{j=1}^{n} C_j A_{jx} B_{jx} = 1 \quad (3)$$

$$\sum C_j A_{jy} B_{jx} = 0 \quad (4)$$

$$\sum C_j A_{jz} B_{jx} = 0 \quad (5)$$

$$\sum C_j A_{jx} B_{jy} = 0 \quad (6)$$

$$\sum C_j A_{jy} B_{jy} = 1 \quad (7)$$

$$\sum C_j A_{jz} B_{jy} = 0 \quad (8)$$

$$\sum C_j A_{jx} B_{jz} = 0 \quad (9)$$

$$\sum C_j A_{jy} B_{jz} = 0 \quad (10)$$

$$\sum C_j A_{jz} B_{jz} = 1 \quad (11)$$

In the above Formulas 3 through 11 the sums extend for $j = 1 \ldots n$. Furthermore, $C_j$ denotes the gain of the $j$th channel, $A_j$ is a vector along the axis of the $j$th pair of detectors. Finally, $B_j$ is a unit vector along the axis of the coil fed from the $j$th pair of detectors.

Equations 3 through 11 are nine in number. This system of nine equations always has a solution where $n$ equals 9 or is greater than 9. This is again true, except for singular cases of the type referred to hereinabove. In that case, the equations can be solved for the $C_j$'s, in other words, for the gain of the $j$ channels. Thus where nine or more pairs of detectors are used, it is possible to find gain adjustments so that the control direction of arrival of the wave can be indicated. Again, it can be shown that an instrument of the type previously discussed will indicate the correct direction of arrival of the pulsed wave, regardless of the direction from which it arrives. This is true, even when the coil axes have an arbitrary orientation.

It can now be shown that the number of pairs of detectors needed to obtain a correct indication can be much reduced if certain simplifying assumptions are made. For example, we may consider that the axis of each indicator coil $B_j$ is parallel to the corresponding axis of a pair of detectors $A_j$. In this case, the set of nine Equations 3 through 11 collapses into a set of six equations. Accordingly, in that case, six pairs of detectors are sufficient to obtain the correct indication of the direction of arrival of a pulsed wave.

Assuming now, that all the detectors are disposed in a plane, and that the indicating coils also are disposed in the same plane. However, the indicating coils are not necessarily aligned with the detectors. On the other hand, the wave may arrive from any direction in three-dimensional space. We may assume that the plane in which both the detectors and the coils lie is the X, Y plane. The readout should give the correct azimuth of the arriving wave independent of the altitude.

In this case, the components $A_{jz}$ and $B_{jz}$ are all 0. Accordingly, Equations 5 and 8 through 11 can all be disregarded. What remains are four equations, namely 3 and 4, as well as 6 and 7. In this case, gain adjustments $C_j$ exist for four or more pairs of detectors. This is, of course, assuming that all coils and detectors are disposed in the same plane.

Assuming now further, that each coils axis is aligned with the axis of the associated detector pair. For this special case, each $B_j$ is a scalar multiple of the corresponding $A_j$. Accordingly, only three equations remain, that is, 3, 6 and 7, all other equations may be disregarded. Also, in these equations for each B, the corresponding $A_j$ may be substituted.

Accordingly, for this special case only, three pairs of detectors are sufficient as well as three coils.

Another special case may find practical application. Here again, three pairs of detectors are used with the additional condition that each detector is used for two different pairs of coils. Accordingly there are three detectors and three coils. Each coil is aligned with the side of the triangle formed by the two detectors to which it is connected. This special case differs only from the equilateral triangle case explained in connection with the embodiment of FIG. 1, in that the triangle of the detector is of arbitrary shape. On the other hand, the gains of the various channels are not necessarily identical as they are in the case of the embodiment of FIG. 1.

A mathematical analysis readily reveals that the necessary gain adjustment exists as long as the three detectors are not disposed in a straight line. A solution of the three equations, that is, Equations 3, 6 and 7 gives the gains required.

It should be noted in general that the necessary gains of the respective channels can either be obtained by a mathematical analysis or by experiment which will determine the gains once and for all for any given arrangement of detectors and coils.

Similarly it can be shown that the gains can be determined where four detectors are disposed in a three-dimensional space. Here each pair of detectors feeds current to that one of six indicator coils having its axis in the direction of the pair. This is true as long as the four detectors do not lie in the same plane.

Still another class of direction indicators having practical importance arises by allowing the current from each pair of detectors to feed more than a single indicator coil. In this case, the ratio of currents to the different coils is fixed. A few simple illustrative examples of practical importance will now be described.

Assuming, for example, that there are given three detectors of arbitrary positions not in a straight line. Assuming further that we have two orthogonal readout coils having axes in the detector plane, these we shall take as the X and Y axes. Only two channels are used. The first channel gives the time of delay between one pair of detectors and the second gives the time of delay between the second pair of detectors. Each of the channels feeds current to both coils. The four gains can be adjusted in such a manner that the azimuth of the incoming wave is correctly indicated.

Thus, to summarize again, by adjusting the gains of the channels, it is possible to utilize detectors disposed in an arbitrary array or pattern. Three or more are needed for azimuth and four or more for three dimensions. The ability to use arbitrarily placed detectors is of practical importance. This is particularly so where symmetrical configuration cannot be used, such, for example, as on cars or airplanes.

It should be noted that the gain of each channel may be adjusted in various manners. For example, in the circuit of FIG. 6 the gains could be adjusted by adjusting the gains of the DC amplifiers 131, 135 and 133. Alternatively the relative sizes of the charge storage capacitors of the networks 127, 128 and 130 may be adjusted. Furthermore, it is feasible to adjust the relative values of the integrating networks 127, 128 and 130; that is, the relative sizes of the resistor and capacitor of each network. Many other ways of adjusting the relative gains of each of the channels may be used.

The indicator of the present invention operates with a minimum of error provided that the pulsed wave is a plane wave. Practically, however, there are applications where the waves are not effectivity plane waves. In other words, the source of the spherical wave may have a finite distance from the center of the detectors. In this case the error can be calculated and is generally a few degrees or less and reaches a maximum of 8.8 degrees if the source of the wave is at the radius of the detectors from the center of the equilateral triangle. Thus if the center of the wave is, say ten times the distance from the center of the triangle to one of the detectors, the error will be considerably less than two degrees. Where it is desired to minimize the error for wave sources at nearby locations it is feasible to utilize two sets of detectors located at the vertices of two concentric equilateral triangles rotated with respect to each other by 60°. The foregoing discussion gives correct indications for any source of a pulsed wave which is essentially located at infinity. This, of course, requires six detectors and three coils. In this case, however, the detectors are disposed along the vertices of an equilateral triangle rather than an arbitrary triangle.

There has thus been disclosed a direction of arrival indicator of a wave pulse. This permits to detect the direction of arrival of a mechanical or even an electric wave by arranging, for example, three detectors at vertices of an equilateral triangle or four detectors along the vertices of a polyhedron. The necessary configuration of the indicating coils can be much simplified. For example, two pairs of coils are sufficient for altitude and azimuth in case separate indications are needed. It is further possible to create an instrument where the detectors are disposed in any arbitrary pattern. By making certain simplifying selection of the read-out device, the number of pairs of detectors can be reduced to three pairs of detectors. This is accomplished by adjusting the gain of each channel to make up for the assymetrical position of the detectors. In general, the instrument of the invention measures the difference of the time of arrival of the wave at the respective detectors and converts this time difference into a current flow through the indicating coils so that the resulting magnetic field is parallel to the direction of arrival of the wave.

What is claimed is:

1. An instrument for indicating the direction of arrival of a wave pulse comprising:
   (a) a predetermined number of detectors, each for detecting the arrival of the wave pulse and for developing an electrical signal in response to the wave pulse, said detectors being arranged in a predetermined pattern;
   (b) a predetermined number of coils, said coils being arranged in a predetermined pattern having a known relation to the pattern of said detectors;
   (c) means coupled between said detectors and said coils for causing a current to flow in each of said coils having an intensity proportional to the difference in the time of arrival of said wave pulse at a predetermined pair of detectors and corresponding to the patterns of said detectors and said coils; and
   (d) means for indicating the direction of the magnetic field created by the current flow through said coils.

2. An instrument as defined in claim 1 wherein three detectors are provided, said three detectors being arranged on the vertices of an equilateral triangle.

3. An instrument as defined in claim 2 wherein three coils are provided, said coils having axes arranged in the direction of the sides of an equilateral triangle parallel to the equilateral triangle formed by said three detectors.

4. An instrument as defined in claim 1 wherein said detectors are arranged at the vertices of a regular polygon.

5. An instrument as defined in claim 1 for indicating the direction of arrival of a wave pulse in three dimensions wherein said detectors are disposed on the vertices of a regular polyhedron.

6. An instrument as defined in claim 5 wherein said polyhedron is a tetrahedron.

7. An instrument as defined in claim 1 wherein two sets of coils are provided, one set for indicating the direction of arrival of the wave pulse in azimuth and the other for indicating the direction of arrival in altitude.

8. An instrument as defined in claim 7 where each of said set of coils consists of two coils disposed at right angles to each other.

9. An instrument as defined in claim 1 wherein said means coupled between said detectors and said coils includes an integrating network for each of said coils, each of said integrating networks including a charge storage capacitor, and electric means coupled between each of said capacitors and its associated coil for delivering an output current proportional to the voltage across its associated capacitor.

10. An instrument as defined in claim 1 wherein at least nine pairs of detectors are provided.

11. An instrument as defined in claim 1 wherein one pair of said detectors is coupled to at least two of said coils for controlling said coils in accordance with the difference in the time of arival of said wave pulse.

12. An instrument for indicating the direction of arrival of a wave pulse in three dimensions comprising:
   (a) a predetermined number of detectors, each for detecting the arrival of the wave pulse and for developing an electrical signal in response to the wave pulse, said detectors being disposed at the vertices of a polyhedron;
   (b) a predetermined number of coils arranged in a predetermined pattern;
   (c) an electronic channel associated with each of said detectors and coupled to said coils for causing a current to flow in each of said coils, said current having an intensity proportional to the difference in the time of arival of said wave pulse at a selected pair of detectors; and
   (d) means for indicating the direction of the magnetic field created by the current flow through said coils.

13. An instrument as defined in claim 12 wherein each of said channels includes an integrating network having a charge storage capacitor, said channel including means for charging each of said capacitors to a voltage proportional to the difference in the time of arrival of said wave pulse at a selected pair of detectors, and means coupled to each of said capacitors for delivery of an output current proportional to the voltage of its associated capacitor, each of said last-named means being coupled to one of said coils.

14. An instrument for indicating the direction of arrival of a wave pulse comprising:
   (a) three detectors, each for detecting the arrival of the wave pulse and for developing an electrical signal in response to the wave pulse, said detectors being disposed on three vertices of a square;
   (b) two coils disposed at right angles to each other;
   (c) means coupled between each selected pair of said detectors and one said coil for causing a current to flow in each of said coils having an intensity proportional to the difference in time of arrival of said wave pulse at an associated pair of detectors; and
   (d) means for indicating the direction of the magnetic field created by the current flow through said coils.

15. An instrument for indicating the direction of arrival of a wave pulse in altitude and azimuth comprising:
   (a) four detectors, one being disposed in the origin and the others along the axes of a rectangular coordinate system, each detector detecting the arrival of the wave pulse and developing an electrical signal in response to the wave pulse;
   (b) a first set of two coils disposed at right angles to each other for indicating the altitude of the direction of arrival of the wave pulse;

(c) a second set of two coils disposed at right angles to each other for indicating the azimuth of the direction of arrival of the wave pulse;

(d) means coupled between selected pairs of said detectors and two of the coils of one of said first sets and one of the coils of the other set for causing a current to flow in each of said coils having an intensity proportional to the difference in the time of arrival of said wave pulse;

(e) further means coupled between said pairs of detectors and the remaining one of said coils for causing a current to flow in said other one of said coils having an intensity proportional to the vector sum of the horizontal components; and (f) means for indicating the direction of the magnetic field created by the current flow through said coils.

16. An instrument as defined in claim 15 wherein the distances between each of three of said detectors and the detector at the origin of the coordinate system are equal.

17. An instrument as defined in claim 15 wherein the distances between each of three of the detectors and the detector at the origin of the coordinate system are unequal, and whereby the currents flowing in each of said coils are adjusted to compensate for the differences in the distances between the detector at the origin of the coordinate system and the remaining detectors.

18. An instrument for indicating the direction of arrival of a wave pulse in three dimensions comprising:

(a) four detectors, each for detecting the arrival of the wave pulse and for developing an electrical signal in response to the wave pulse, one of said detectors being disposed in the origin of a rectangular coordinate system and the other three along the axes of said coordinate system;

(b) a predetermined number of coils arranged in three dimensions to indicate the direction of arrival of the wave;

(c) means coupled between said detectors and said coils for causing a current to flow in each of said coils having an intensity proportional to the difference in the time of arrival of said wave pulse at a predetermined pair of detectors; and (d) means for indicating the direction of the magnetic field created by the current flowing through said coils.

19. The method of determining the direction of arrival of a wave pulse comprising the steps of:

(a) determining the difference in the time of arrival of the wave pulse at selected pairs of points in space;

(b) developing electrical signals each being representative of the difference in the times of arrival of the wave pulse between a selected pair of points;

(c) converting each of said signals into a voltage having a magnitude proportional to the difference in the times of arrival of the wave pulses at each selected pair of points;

(d) converting each of said voltages into a corresponding current to create an electrical current flow in space and a resulting magnetic field; and (e) indicating the direction of the resulting magnetic field.

References Cited

UNITED STATES PATENTS

| | | | |
|---|---|---|---|
| 3,042,897 | 7/1962 | Papineau | 340—6 |
| 2,188,556 | 1/1940 | Nickel | 324—90X |
| 2,434,644 | 1/1948 | Fairweather | 340—6X |
| 3,383,690 | 5/1968 | Keller | 343—113 |

RICHARD A. FARLEY, Primary Examiner

R. E. BERGER, Assistant Examiner

U.S. Cl. X.R.

324—90; 340—6